July 5, 1960
F. W. DUHM
2,943,881
MAGNETIC CATCH
Filed Sept. 26, 1957
2 Sheets-Sheet 1
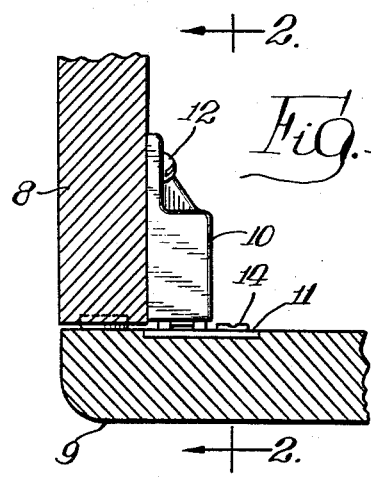
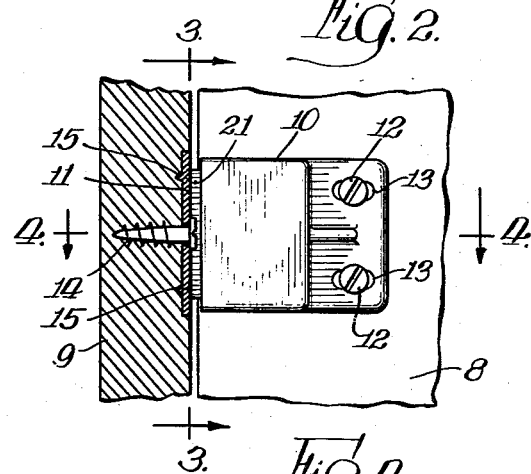
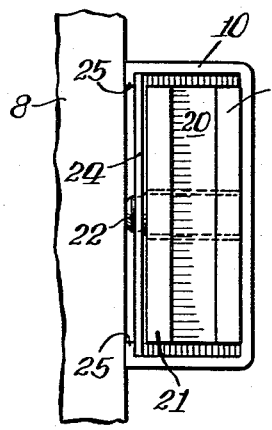
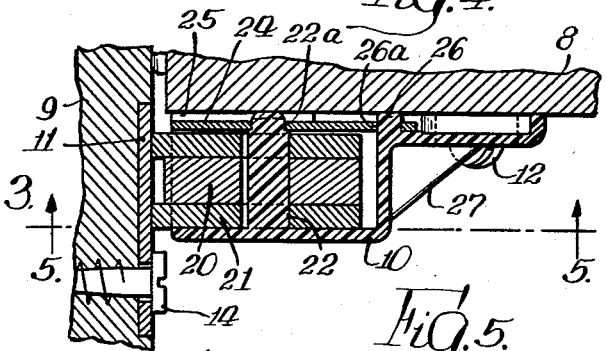
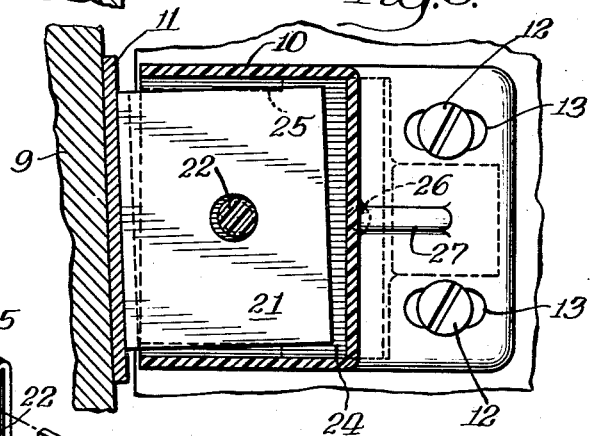
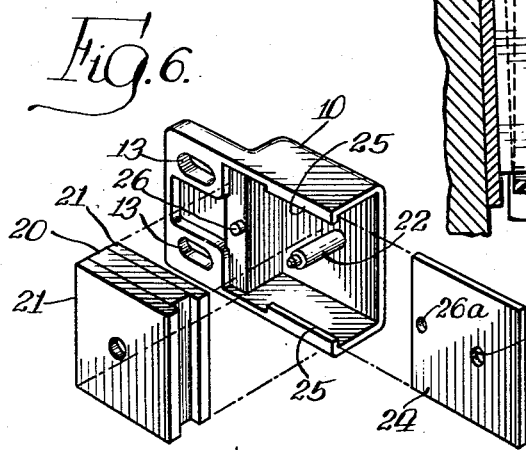
INVENTOR.
Frank W. Duhm,
BY Fidler, Crouse & Beardsley
Atty's.

July 5, 1960 F. W. DUHM 2,943,881
MAGNETIC CATCH

Filed Sept. 26, 1957 2 Sheets-Sheet 2

INVENTOR.
Frank W. Duhm
BY Fidler, Crouse &
Beardsley
Attorneys

United States Patent Office 2,943,881
Patented July 5, 1960

2,943,881

MAGNETIC CATCH

Frank W. Duhm, Sterling Ill., assignor to National Manufacturing Co., Sterling, Ill., a corporation of Illinois Filed Sept. 26, 1957, Ser. No. 686,540

13 Claims. (Cl. 292—251.5)

This invention relates to a magnetic catch and it is an object of the invention to provide an improved device of this character. This application is a continuation-in-part of a prior application filed March 19, 1957, Serial No. 647,125, now abandoned.

The magnet or magnet assembly of a magnetic catch preferably has two opposite poles lying substantially in a common plane such that they may engage an armature, the armature being mounted for example on a door member or cabinet member and the magnet or magnet assembly being mounted on the other member. The magnet is therefore U-shaped in effect, and might comprise a single magnetized bar bent into a true U-shaped formation. However, in order to obtain the advantages of high quality magnet materials such as Alnico and to avoid expensive machining of these hard-to-work materials, a simple bar or plate of such magnetic material is commonly employed with only the two opposed pole faces thereof necessarily being substantially flat. Soft iron plates may then be applied to the two pole faces of the magnet proper. The pole pieces preferably extend slightly beyond at least one edge of the magnet proper, whereby a magnet assembly is produced which is in effect U-shaped.

This magnet assembly is preferably arranged loosely within a non-magnetic housing whereby the pole pieces may pivot about at least one axis to come into full contact with a cooperating armature plate, even though the cabinet or other construction with which the catch is employed may be warped or for any reason misaligned. At the same time the magnet assembly is of course retained firmly within the housing. A magnetic catch constructed in accordance with the preferred embodiment of the present invention incorporates these construction features and the advantages which arise therefrom.

It is another object of the invention to provide an improved magnetic catch having the characteristics described above while being constructed of a small number of easily assembled parts.

It is a further object of the invention to provide an improved magnetic catch of the character described above in which it is assured that the magnet assembly will be freely pivotable within its magnetic housing after its assembly therewith.

It is still another object of the invention to provide an improved magnetic catch of the character described above which is particularly adapted to installation where limited catch supporting structure is available.

This invention, together with further objects and advantages thereof, will best be understood by reference to the following description taken in connection with the accompanying drawing, and its scope will be pointed out in the appended claims.

In the drawings, in which like parts are designated by like reference numerals:

Figure 1 is a plan view of a magnetic catch illustrating one embodiment of the invention applied to a cabinet and cabinet door;

Fig. 2 is a view of the same construction taken along the line 2—2 of Fig. 1;

Fig. 3 is a cross-sectional view taken along the line 3—3 of Fig. 2;

Fig. 4 is a cross-sectional view taken along the line 4—4 of Fig. 2;

Fig. 5 is a cross-sectional view taken along the line 5—5 of Fig. 4;

Fig. 6 is an exploded perspective view of the same magnetic catch exclusive of the armature plate;

Figure 7:
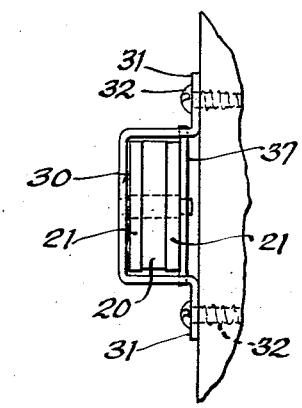
Fig. 7 is an end view of a magnetic catch illustrating another embodiment of the invention.

As indicated above, certain construction features have become widely accepted in the manufacture of magnetic catches and certain of these are incorporated in the illustrated embodiment of the invention. As will subsequently become apparent, however, the invention is applicable to magnetic catches which may differ substantially in these respects.

The magnetic catch illustrated in the drawing is shown applied to a cabinet 8 and a cabinet door 9. Secured to one wall of the cabinet 8 is a housing 10 which contains a magnet assembly, and an armature 11 is secured to the cabinet door 9. Alternatively these parts may be reversed, the armature 11 being secured to the cabinet 8, and the housing with its magnet assembly being secured to the door 9. The housing 10 may be secured to the cabinet or other member as by a pair of screws 12 extending through elongated slots 13 in a rearward, flange-like portion of the housing. Elongation of the slots 13 permits convenient adjustment of the position of the housing 10 to obtain optimum results. The armature plate 11 may be secured to an associated member such as the cabinet door 9 by a screw 14. The door facing surface of the armature plate 11 preferably has at least two small tips or protrusions 15 formed thereon as best seen in Fig. 2. These protrusions serve a dual purpose. After the housing 10 has been mounted on the cabinet 8, the armature plate 11 may be brought to its proper position on the door 9 and pressed firmly thereagainst. The protrusions 15 produce indentations in the door, after which the door amy be opened and the armature plate may be located in its proper position by setting the protrusions 15 in the same indentations. This provides a convenient method of properly locating the armature plate for final attachment to the door or for marking the door for cutting a recess for the plate. The protrusions 15 may also serve to prevent rotation of the plate about a single mounting screw.

The magnet assembly arranged within the housing 10 is best seen in Figs. 3, 4 and 6. The assembly includes a magnet 20 of Indox ceramic, Alnico, or like material, having its two poles faces machined, ground, or otherwise formed substantially flat. Two soft iron pole pieces 21 are applied to the two pole faces of the magnet proper to form what is in effect a U-shaped magnet.

The housing 10 is open on two adjacent sides as seen best in Fig. 6. A post 22 is secured to one side of the housing opposite one of the two open sides and extends toward that open side. In accordance with the preferred embodiment of the invention, the housing 10 is formed of plastic, in which case the post 12 may be formed integrally with the principal portions of the housing.

An opening is provided through the entire magnet assembly of sufficient diameter as to receive the post 22 freely. Furthermore the various parts are so dimensioned that when the magnet assembly is inserted in the housing 10, the post 22 extending through the magnet assembly, there is substantial clearance between the three narrow sides of the magnet assembly and three corresponding sides of the housing, all as best seen in Fig. 5. It may be seen there that the magnet assembly has been rotated through an appreciable angle with respect to the housing 10 such that the pole pieces 21 may be aligned with the armature plate 11 which is misaligned with respect to the housing 10. It may be seen furthermore that such appreciable pivotal movement of the magnet assembly with respect to the housing 10 is permitted by virtue of the substantial clearance between the narrow sides of the magnet assembly and the corresponding sides of the housing 10, and by the loose fit of the post 22 within the opening in the magnet assembly.

The open side of the housing 10 through which the magnet assembly is inserted is subsequently closed by a plate 24 of non-magnetic material such as aluminum or plastic. The closure plate 24 has an opening 22a therethrough for receiving the free end of the post 22. As seen best in Fig. 4 the free end of the post 22 is of reduced diameter whereby a shoulder is provided against which the closure plate 24 may bear. This limits inward movement of the closure plate 24 and assures freedom of movement of the magnet assembly within the housing, the height of the post 22 up to the shoulder thus provided being greater than the thickness of the magnet assembly, all as best seen in Fig. 4.

The housing 10 is provided with a pair of flanges 25 which are arranged to overlie the outer surface of the closure plate 14. Where the housing is formed of resilient plastic material and where the flanges, as shown in Fig. 6, terminate substantially short of the closed wall of the housing toward which they extend, the sides of the housing supporting the flanges 25 may readily be sprung apart sufficiently to permit reception of the closure plate 24 thereunder.

Preferably a second post 26 is provided on the housing 10 and a corresponding hole 26a is arranged in the closure plate 24 for reception thereof. By this means the closure plate 24 is firmly anchored against outward movement and accordingly lends substantial support for the otherwise free end of the post 22. More specifically this supports the otherwise free end of the post 22 against movement in the direction of the pulling force applied to the magnet assembly when the armature plate 11 is pulled away from the housing 10.

Both of the posts 22 and 26 preferably terminate short of that surface of the housing which is to bear against the cabinet 8 in order that the housing may seat firmly thereagainst. A gusset 27 is preferably formed between the rearward or flange portion of the housing and the rear wall in order to provide greater strength and rigidity of the overall housing.

Figure 10:
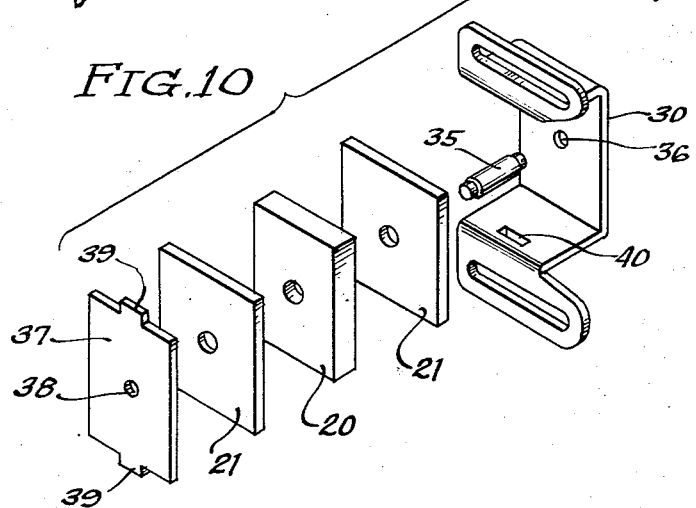
Fig. 10 is an exploded perspective view of the magnetic catch of Figs. 7-9.

The embodiment of the invention disclosed in Figs. 7-12 employs some of the more basic concepts of the above described embodiment shown in Figs. 1-6 but it also includes a number of novel features not present in the first described embodiment. As best seen in Fig. 10, this embodiment of the invention includes a housing 30 which may be formed from a single sheet of suitable material, preferably non-magnetic metal such as aluminum. Essentially the housing is U-shaped, forming three walls of a parallelepiped construction, with mounting flanges 31 extending therefrom. Suitable fastening means such as screws 32 may extend through slots 33 in the mounting flanges 31.

As in the previously described embodiment a post 35 is employed to restrain the magnet assembly, but in the present instance it is not integral with the housing 30. The post is preferably formed of plastic and has reduced end portions and adjoining shoulders as is readily seen in Fig. 10. One of these reduced end portions is inserted in an opening 36 in the center of the middle wall portion of the housing 30, the adjoining shoulder abutting that wall to seat the post.

The magnet assembly may be the same as in the previously described embodiment employing a permanent magnet 20 and two pole pieces 21 preferably of soft iron. The magnet assembly has a central opening for freely receiving the post 35 and is readily assembly on the post. A cover plate or closure 37 has a central opening 38 for receiving the reduced end portion of the otherwise free end of the post. Again, the adjacent shoulder of the post fits against the inner surface of the closure member 37. The length of the post between shoulders is preferably longer than the thickness of the magnet assembly whereby the closure member 37 is prevented from engaging and binding the magnet assembly.

The closure member 37 also has a pair of ears 39 which are insertable in slots 40 in the side walls of the housing 30. As in the case of the first described embodiment, the housing is sufficiently flexible that the side walls may be moved outwardly to permit reception of the closure member ears 39 in the slots 40.

Figure 8:
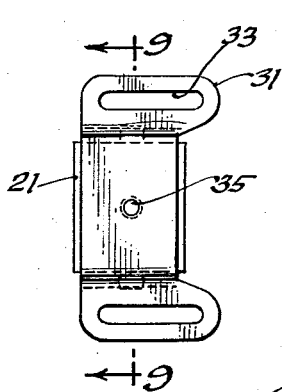
Fig. 8 is a bottom plan view of the magnetic catch of Fig. 7.
Figure 9:
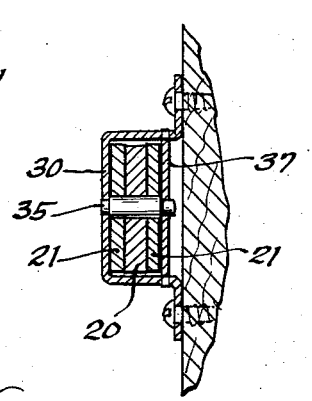
Fig. 9 is a cross-sectional view taken along the line 9—9 of Fig. 8.
Figure 11:
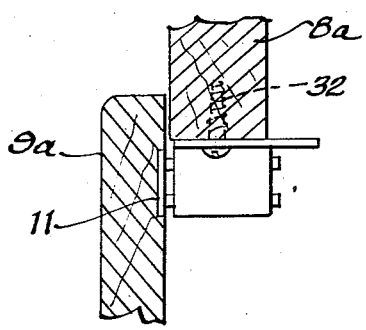
Figs. 11 and 12 are side views of the magnetic catch of Figs. 7-10, the magnetic catch being employed in applications where the available supporting structure is limited.

In the embodiment of the invention illustrated in Figs. 7-12 it will be noted that there are two opposed open walls of the housing after complete assembly, and that the pole pieces 21 project through both of these openings. Also, the mounting flanges 31 extend beyond one of the open sides of the housing, as best seen in Fig. 8. These two factors provide a flexibility of application of this magnetic catch which is not obtained in other devices of this character. In Fig. 11 an application of this catch is disclosed in which the catch is mounted on a relatively narrow frame member 8A which is immediately adjacent the armature 11 set in the door 9A. It will be seen that the screws 32 must be inserted closely adjacent the operating side of the magnetic catch. The embodiment of the invention illustrated in Fig. 6 would not be suitable in this application.

Figure 12:
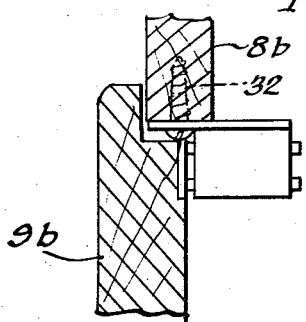

In the application of Fig. 12 the magnetic catch is mounted on a cabinet frame member 8b which fits into a recess in a door 9b. In this instance the catch must be set back away from the outer surface of the frame member 8b to such an extent that the catch could not be employed except by its being reversed with respect to its orientation in Fig. 11. The fact that this catch has two open sides with the magnet pole pieces 21 extending through both sides permits such reversal, and the extension of the supporting flanges 31, and more specifically the slots 33, beyond one open side of the housing proper permits the location of the mounting screws 32 at a point where they may properly support the magnetic catch. It will thus be seen that the embodiment of the invention shown in Figs. 7-12 is extremely flexible in its application.

A magnetic catch has now been disclosed having a small number of readily assembled parts. The magnet assembly thereof is freely pivotable within the housing such that it may align itself with an armature plate even though the latter is substantially misaligned with respect to the housing. At the same time the magnet is firmly retained wtihin the housing by a post which is in turn firmly supported at both ends.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. A magnetic catch comprising a housing having two adjacent open sides, a post mounted on a side of said housing opposite one of said open sides and extending toward said one open side, a magnet assembly having an opening therethrough freely receiving said post, said housing and said magnet assembly being so dimensioned that said magnet assembly may protrude through the other of said open sides and may pivot through a substantial angle about said post within said housing, a closure for said one open side, said closure having an opening for receiving the free end of said post, said post having a shoulder adjacent its free end for limiting inward movement of said closure, the length of said post within said housing being greater than the thickness of said magnet assembly, and means for securing said closure to said housing, whereby said closure supports the otherwise free end of said post.

2. A magnetic catch comprising a housing having two adjacent open sides, a post mounted on a side of said housing opposite one of said open sides and extending toward said one open side, a magnet assembly having an opening therethrough freely receiving said post, said housing and said magnet assembly being so dimensioned that said magnet assembly may protrude through the other of said open sides and may pivot through a substantial angle about said post within said housing, a closure for said one open side, said closure having an opening for receiving the free end of said post, and flange means adjacent engaging edges of said closure and said housing for holding said closure inwardly of said housing, said housing being sufficiently flexible to permit flexing thereof for reception of said closure.

3. A magnetic catch comprising a housing having two adjacent open sides, a post secured to a side of said housing opposite one of said open sides and extending toward said one open side, a magnet assembly having an opening therethrough freely receiving said post, said housing and said magnet assembly being so dimensioned that said magnet assembly may protrude through the other of said open sides and may pivot through a substantial angle about said post within said housing, and a closure for said one open side, said closure having an opening for receiving the free end of said post, said housing having flanges along a portion of two opposed edges of said one open side adjacent said other open side receiving two opposed edges of said closure thereunder, said housing also having a second post adjacent the edge of said one open side opposite said other open side, and said closure having an opening receiving said second post, whereby said closure is anchored against movement toward said other open side and supports the otherwise free end of said first mentioned post.

4. A magnetic catch comprising a housing having two adjacent open sides, a post secured to a side of said housing opposite one of said open sides and extending toward said one open side, a magnet assembly having an opening therethrough freely receiving said post, said housing and said magnet assembly being so dimensioned that said magnet assembly may protrude through the other of said open sides and may pivot through a substantial angle about said post within said housing, and a closure for said one open side, said closure having an opening for receiving the free end of said post, said post having a shoulder adjacent its free end for limiting inward movement of said closure, the length of said post from said shoulder to its secured end being greater than the thickness of said magnet assembly, said housing having flanges along a portion of two opposed edges of said one open side adjacent said other open side receiving two opposed edges of said closure thereunder, said housing also having a second post adjacent the edge of said one open side opposite said other open side, and said closure having an opening receiving said second post, whereby said closure is anchored against movement toward said other open side and supports the otherwise free end of said first mentioned post.

5. A magnetic catch comprising a housing having two adjacent open sides, a post secured to a side of said housing opposite one of said open sides and extending toward said one open side, a magnet assembly including a permanent magnet and a pair of pole pieces arranged against opposite poles of said magnet, said magnet assembly having an opening through the three elements thereof freely receiving said post, said housing and said magnet assembly being so dimensioned that at least said pole pieces may protrude through the other of said open sides and said magnet assembly may pivot through a substantial angle about said post within said housing, and a closure for said one open side, said closure having an opening for receiving the free end of said post, said post having a shoulder adjacent its free end for limiting inward movement of said closure, the length of said post from said shoulder to its secured end being greater than the thickness of said magnet assembly, said housing having flanges along a portion of two opposed edges of said one open side adjacent said other open side receiving two opposed edges of said closure thereunder, said housing also having a second post adjacent the edge of said one open side opposite said other open side, and said closure having an opening receiving said second post, whereby said closure is anchored against movement toward said other open side and supports the otherwise free end of said first mentioned post.

6. A magnetic catch comprising a housing having two adjacent open sides, a post having a reduced end portion extending into a hole in one side of said housing and having a shoulder abutting against said side, said side of said housing lying opposite one of said open sides, and said post extending toward said one open side, a magnet assembly having an opening therethrough freely receiving said post, said housing and said magnet assembly being so dimensioned that said magnet assembly may protrude through the other of said open sides and may pivot through a substantial angle about said post within said housing, a closure for said open side, said closure having an opening for receiving the free end of said post, and means for securing said closure to said housing whereby said closure may support the otherwise free end of said post.

7. A magnetic catch comprising a housing having two adjacent open sides, a post having a reduced end portion extending into a hole in one side of said housing and having a shoulder abutting against said side, said one side of said housing lying opposite one of said open sides, and said post extending toward said one open side, a magnet assembly having an opening therethrough freely receiving said post, said housing and said magnet assembly being so dimensioned that said magnet assembly may protrude through the other of said open sides and may pivot through a substantial angle about said post within said housing, a closure for said one open side, said closure having an opening for receiving a reduced end portion of the free end of said post, said post having a second shoulder abutting said closure, the length of said post between said shoulders being greater than the thickness of said magnet assembly, and flange means adjacent engaging edges of said closure and said housing for holding said closure inwardly of said housing, said housing being sufficiently flexible to permit flexing thereof for reception of said closure.

8. The magnetic catch of claim 7 in which said flange means include a pair of ears protruding from opposite sides of said closure and a pair of openings in opposite walls of said housing for receiving said ears.

9. A magnetic catch comprising a housing having two opposed open sides, a post extending through said housing and supported by two opposed walls thereof, a magnet assembly having an opening therethrough freely receiving said post, said housing and said magnet assembly being so dimensioned that said magnet assembly may protrude through each of said open sides and may pivot through a substantial angle about said post within said housing, and a pair of mounting flanges extending outwardly of said housing, said mounting flanges each having a slot for receiving a fastening element, said slots extending in a direction generally parallel to the walls of said housing and extending beyond the walls of said housing in one direction.

10. A magnetic catch comprising a housing formed in part of a U-shaped member constituting a central wall and two side walls of said housing, a post having a reduced end portion extending into a hole in said central wall and having a shoulder abutting against said central wall, said post extending perpendicular to said central wall and between said side walls, a magnet assembly having an opening therethrough freely receiving said post, said housing member and said magnet assembly being so dimensioned that said magnet assembly may protrude through at least one open side of said housing and may pivot through a substantial angle about said post within said housing, a closure for the side of said housing opposite said central wall, said closure having an opening for receiving a reduced end portion of the free end of said post, said post having a second shoulder abutting said closure, the length of said post between said shoulders being greater than the thickness of said magnet assembly, and flange means adjacent engaging edges of said closure and said housing member for holding said closure inwardly of said housing member, said housing member being sufficiently flexible to permit flexing thereof for reception of said closure.

11. A magnetic catch comprising a housing member having at least three connected walls and first and second open sides opposite at least two adjacent ones of said walls respectively, a post mounted on and projecting from one of said adjacent walls and extending toward said first open side, a magnet assembly having an opening therethrough freely receiving said post, said magnet assembly being dimensioned relatively to said housing whereby said assembly protrudes through said second open side and is pivotable through a substantial angle about said post and within said housing and a removable closure closing said first open side.

12. The invention as set forth in claim 11 wherein said closure has an opening for snugly receiving the end of said post which is away from its said one wall to thereby support said end of said post.

13. A magnetic catch comprising a housing member having first and second generally parallel walls and a third wall connecting said first and second walls and adjacent open sides at least one of which is opposite said third wall, a post mounted on and projecting perpendicularly from said third wall toward the opposite open side, a magnet assembly having an opening therethrough freely receiving said post, said magnet assembly being dimensioned relatively to said housing whereby said assembly protrudes through said second open side and is pivotable through a substantial angle about said post and within said housing and a removable closure closing said open side which is opposite said third wall.

References Cited in the file of this patent
UNITED STATES PATENTS

| | | |
|---|---|---|
| 2,240,035 | Catherall | Apr. 29, 1941 |
| 2,792,249 | Saxton | May 14, 1957 |
| 2,837,366 | Loeb | June 3, 1958 |
| 2,877,040 | Curtiss et al. | Mar. 10, 1959 |